Patented Oct. 25, 1938

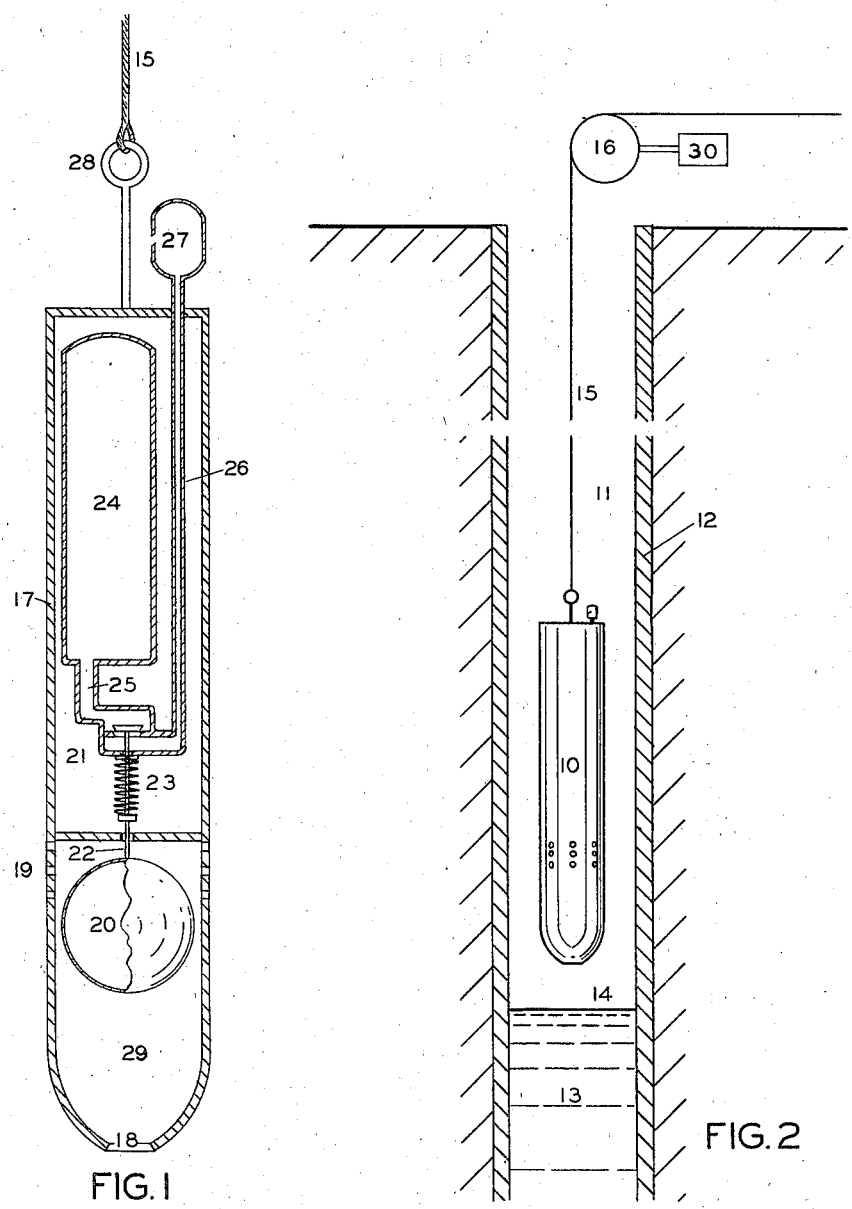

2,134,428

UNITED STATES PATENT OFFICE 2,134,428

APPARATUS FOR EXPLORING THE LEVEL OF LIQUID IN A BORE HOLE

Serge Alexander Scherbatskoy and Jacob Neufeld, Tulsa, Okla., assignors to Engineering Laboratories, Inc., Tulsa, Okla., a corporation of Oklahoma Application July 24, 1937, Serial No. 155,478

3 Claims. (Cl. 73—305)

Our invention relates to a means for locating the level of liquid in a liquid filled drill hole.

One of the purposes of our invention is to provide a means for surveying the level of oil in an oil producing well in order to determine the quantity of liquid to be pumped and to ascertain the most efficient and the most economical pumping conditions.

In the prior art attempts have been made for determining the level of liquid in oil wells by applying the well known echo principle for depth determination. Accordingly, compressed gas has been released into the top of the casing thereby creating a pressure wave which travelled down the well and back again and with proper apparatus for recording the echoes and determining the velocities at which the waves travel, attempts have been made for determining fluid level in oil wells. (See "The depthograph, a new instrument for the production engineer" by C. P. Walker, California Oil Weekly, October 15, 1936, p. 8–9 and 24–25.) This prior method is not believed to be as accurate or reliable as is desirable, because of the physical difficulties attendant to the operation of the method.

It is therefore an object of our invention to provide a simple and reliable apparatus for determining the level of liquid in any liquid filled drill hole.

It is a further object of our invention to provide an apparatus for determining the level of the boundary between two different liquids located in a drill hole.

It is a further object of our invention to determine the depth at which the liquid in the drill hole possesses a predetermined density.

It is still a further object of our invention to determine the variation of the density of the liquid with respect to depth in the drill hole.

The novel features which we believe to be characteristic of our invention are set forth with particularity in the appended claims. Our invention, itself, however, will be better understood by reference to the following description taken in connection with the accompanying drawing in which:

Figure 1 represents an exploring device for producing an acoustical signal in accordance with our invention.

Figure 2 represents the general arrangement for exploring the level of liquid in a drill hole, in which the device of Figure 1 is used.

Referring now more particularly to Figure 2, the numeral 10 designates the exploring instrument in the process of being lowered into a drill hole 11. The drill hole is provided with a casing 12 and is filled with a column of oil 13, the said column of oil extending up to the level 14. It is desired to determine the level 14 of the oil column. The device 10 is suspended by cable 15 which is wound above ground upon a cable drum 16 by which the device 10 can be lowered and raised in the bore hole. The drum 16 is provided with a revolutions counter 30.

The structural features of the exploring device 10 are represented in detail in Figure 1. Referring now more particularly to Figure 1, the numeral 17 is a cylindrical housing with a tapered lower section designed so as to fit conveniently into the bore hole to be explored. The lower end of the housing 17 has openings 18 and 19 arranged so as to permit free entrance of the liquid 13, the level of which is being surveyed. The numeral 20 designates a float designed to actuate the valve 21 by means of the rod 22; 23 is a spring arranged so as to keep the valve 21 closed. The tank 24 is filled with compressed air and is connected by means of the tube 25, valve 21 and the tube 26 to the whistle 27 situated at the outside of the housing 17. Numeral 28 designates a lifting ring to which the cable 15 is attached. Numeral 29 designates a cavity in which the float 20 is located.

The operation of the device is as follows:

By means of the cable 15 the exploring instrument 10 is slowly lowered into the bore hole. The spring 23 maintains the valve 21 closed as long as the float 20 is not buoyed up by a liquid. Upon reaching the level 14 of the liquid the cavity 29 fills with liquid and the float 20 is buoyed up. The rod 22 is raised compressing the spring 23 and opening the valve 21, allowing the compressed air in 24 to escape through the tubes 25 and 26 and blow the whistle 27.

It is therefore apparent that whenever during the process of lowering the exploring device 10 into the drill hole, the cavity 29 of the exploring device reaches the level 14 and becomes subsequently submerged in the liquid 13, a sound signal is transmitted from the whistle 27 to the top of the drill hole. It is obvious that the length of the cable 15 at which the sound signal appears can be readily determined by any of the means well known in the art, as for instance, by means of the measured pulley 16 equipped with a revolutions counter 30. By observing the length of the cable at which the sound signal appears the depth corresponding to the liquid level 14 is readily determined.

A further application of our invention consists in determining the variation of the density of the liquid with depth in a drill hole. In particular, in wells producing large quantities of gas the fluid is seldom as dense within the well during production as it is in a sample drawn from the well and from which the gas has been allowed to escape.

Many wells have been pumped at low volumetric efficiency because it could not be determined whether there was a lack of liquid in the wall or whether the fluid was too light for the pump to handle efficiently. In such instances our method can be very advantageously used in order to determine the depths at which the liquid possesses certain predetermined density and consequently derive therefrom the variation of the density of the liquid with respect to depth throughout the well.

In that connection, if we refer again to Figure 1 it may be readily seen that the valve 21 is subjected to the action of two forces: the force of the spring 23 tending to close the valve and the hydrostatic pressure upon the buoy 20 tending to open the valve.

Assume that the well to be explored possesses a high gas-oil ratio, and consequently the liquid contained in the well has a variable density which gradually increases with the depth. When the exploring device 10 is suspended at a comparatively small depth at which the density of the liquid is small the force of the spring 23 predominates and consequently the valve 21 is closed. By lowering the exploring device the density of liquid in which the float 20 becomes submerged gradually increases and consequently the hydrostatic force acting upon the float and tending to counterbalance the action of the spring 23 gradually increases. At a certain depth a liquid density is reached which is sufficiently great to cause the hydrostatic force acting upon the float to predominate upon the spring and consequently the valve 21 opens. Then the compressed air from the reservoir 24 enters the whistle 27 through the tubing 25 and 26 and emits a sound which becomes transmitted to the surface of the earth. By means of this signal the depth at which the liquid possesses a predetermined density can be readily evaluated.

From the foregoing description it is thought to be obvious that the survey in a liquid filled drill hole as described in accordance with our invention is particularly well adapted for use by reason of the convenience and facility with which it may be practised.

In view of our invention and disclosure, variations and modifications to meet individual whim or particular need will doubtless become evident to others skilled in the art to obtain all or part of the benefits of our invention without copying the structure shown and, we therefore claim all such in so far as they fall within the reasonable spirit and scope of our invention.

We claim:

1. A device for surveying the level of liquid in a liquid filled drill hole, consisting of a housing, a cable for supporting said housing and for permitting its travel through the drill hole, a sound generator, a reservoir of compressed air disposed within said housing, a valve between the said reservoir and the said sound generator, a floating member connected to the said valve and suspended within said housing, the said floating member being adapted upon the contact with liquid to open the said valve.

2. A device for surveying the level of liquid in a liquid filled drill hole, consisting of an explorer housing, a cable for supporting said housing and for permitting its travel through the drill hole, means for determining the depth at which the housing is suspended, a sound generator and a reservoir of compressed air disposed within said housing, a valve between the said reservoir and the said sound generator, a floating member connected to the said valve and suspended within said housing, the said floating member, being adapted upon the contact with liquid to open the said valve allowing the said reservoir to be operatively connected to the said sound generator.

3. In an apparatus for surveying the level of liquid in a liquid filled bore hole, a sound generator and a reservoir of energy, means for producing an operative connection between the sound generator and a reservoir of energy when exposed to the action of the said liquid, means for lowering the sound generator and the energy reservoir to various depths within the bore hole, and means for determining the depths to which the sound generator has been lowered.

SERGE A. SCHERBATSKOY.
JACOB NEUFELD.